(12) United States Patent
Pham

(10) Patent No.: US 10,709,076 B2
(45) Date of Patent: Jul. 14, 2020

(54) SMART CABINET FOR HOME GARDENING

(71) Applicant: Tuan Anh Pham, Ho Chi Minh (VN)

(72) Inventor: Tuan Anh Pham, Ho Chi Minh (VN)

(73) Assignee: TREANT PROTECTOR PTE. LTD., Bugis Cube (SG)

( * ) Notice: Subject to any disclaimer, the term of this patent is extended or adjusted under 35 U.S.C. 154(b) by 0 days.

(21) Appl. No.: 16/139,097

(22) Filed: Sep. 23, 2018

(65) Prior Publication Data

US 2019/0261589 A1 Aug. 29, 2019

Related U.S. Application Data

(60) Provisional application No. 62/608,536, filed on Dec. 20, 2017.

(51) Int. Cl.
| | |
|---|---|
| *A01G 31/06* | (2006.01) |
| *A01G 9/02* | (2018.01) |
| *A01G 27/00* | (2006.01) |
| *A01G 9/029* | (2018.01) |

(52) U.S. Cl.
CPC .............. *A01G 31/06* (2013.01); *A01G 9/023* (2013.01); *A01G 9/027* (2013.01); *A01G 9/0297* (2018.02); *A01G 27/006* (2013.01); *A01G 27/008* (2013.01)

(58) Field of Classification Search
CPC ...... A01G 31/06; A01G 9/0297; A01G 9/023; A01G 9/027; A01G 27/006; A01G 27/008; A01G 9/022; A01G 9/14; A01G 9/20; A01G 9/24; A01G 9/241; A01G 9/247; A01G 9/26; A01G 9/249; A01G 27/005; A01G 27/001; A01G 27/02; A01G 27/06; A01G 7/045; A01G 9/16; A01G 9/02; A01G 2031/006; A01G 31/02
See application file for complete search history.

(56) References Cited

U.S. PATENT DOCUMENTS

| | | | | |
|---|---|---|---|---|
| 2,733,427 A | * | 1/1956 | Chandler ................. | E05F 17/00 49/31 |
| 8,234,812 B1 | * | 8/2012 | Colless ..................... | A01G 9/16 47/61 |
| 8,910,419 B1 | * | 12/2014 | Oberst .................... | A01G 31/06 47/60 |
| 2003/0101645 A1 | * | 6/2003 | Cole ....................... | A01G 31/02 47/61 |
| 2011/0232186 A1 | * | 9/2011 | Lewis ..................... | A01G 31/06 47/66.6 |
| 2014/0115958 A1 | * | 5/2014 | Helene ..................... | A01G 9/14 47/17 |

(Continued)

*Primary Examiner* — Trinh T Nguyen

(57) ABSTRACT

A smart home gardening cabinet is disclosed that includes a plurality of plant growing drawers each having a vertical lift door and an automatic precision weather system to grow a specific type of plants, each automatic precision weather system includes an array of lights for photosynthesis, an air circulation system, and a water circulation system that provides nutrient water to the specific plants in each plant growing drawer; each plant growing drawers having a plant growing tray that includes an array of growing holes filled with a sponge materials to absorb and retain nutrients which are misted to the roots of the plants, excess nutrient water being returned to the water circulation system to save water.

20 Claims, 9 Drawing Sheets

(56) References Cited

U.S. PATENT DOCUMENTS

| | | | | |
|---|---|---|---|---|
| 2014/0144078 A1* | 5/2014 | Gonyer | ............... | A01G 31/02 |
| | | | | 47/62 A |
| 2016/0212954 A1* | 7/2016 | Argento | ............... | A01G 31/06 |
| 2016/0316646 A1* | 11/2016 | Lepp | ............... | A01G 7/045 |
| 2017/0094920 A1* | 4/2017 | Ellins | ............... | A01G 31/02 |
| 2017/0099791 A1* | 4/2017 | Joseph | ............... | A01G 31/04 |
| 2017/0223912 A1* | 8/2017 | Gagne | ............... | A01G 25/16 |
| 2017/0347547 A1* | 12/2017 | Lu | ............... | A01G 31/02 |

\* cited by examiner

SMART CABINET FOR HOME GARDENING

CROSS REFERENCE TO RELATED APPLICATION

This non-provisional utility patent application claims priority filing benefit of U.S. Provisional Patent No. 62/608,358 filed Dec. 20, 2017, which is hereby incorporated by reference in its entirety.

FIELD OF THE INVENTION

The present invention relates generally to the field of plant agriculture. More specifically, the present invention relates to devices for home gardening.

BACKGROUND ART

The trend for organic gardening at home and in restaurants keeps increasing. Homeowners and restaurenteurs in cities want to consume healthier organic plants and vegetables that they either (1) know the growing conditions, and (2) control or grow themselves. Nutrient-rich and healthy organic plants and vegetables free of disease, pest resistance, and without the use of chemicals are in high demand. For the healthiest plants and vegetables, the optimal growing conditions are required.

Since soils deteriorate with time. Menure and compost are used to enrich the soils. However, the traditional growing method using soils require a large land area and soils are difficult to maintain. Different methods of healthy plant/vegetables growing in urban settings include areoponics and hydroponics. Hydroponics is noticeably better than conventional farming methods since the basic requirements of a plant are few-water, sunshine, and nutrients. In a hydroponic system, a plant does not need an extensive root system because it does not have to expend energy seeking nutrients as it does when grown in the ground. Aeroponics is a method of growing plants in a moist environment. The plants are suspended in an enclosed setting and water, mixed with plant food, is sprayed onto the roots. Aeroponics systems are frequently employed in an enclosed environment like a greenhouse so that the temperature and humidity can be accurately regulated. Although sunlight is the principal light source, some additional lighting may also be added.

In an aeroponics system, the roots of the plants are misted with nutrients, water, and oxygen. Using a closed loop system, 95% less water than field farming is used and 40% less than hydroponics. LED lights are used to create a precise light formula for each plant, giving the plants the exact range, intensity, and frequency that the plants require for photosynthesis in the most energy-efficient way. With aeroponics, a grower can take the exact same seed from the field and grow it in half the time as a traditional field farmer, leading to 390 times more productivity per square foot than a commercial field farm. Using aeroponic technology, researchers discovered the yields of plants grown were more than 30% larger on average. For example, red kale had a 65% increase, bell peppers had a 53% increase, cucumbers were 7% larger, and squash 50%. Both aeroponic and soil growing methods produced comparable nutritional value. With traditional growing methods in soil, a lot of space is required. The problem is that we have less and less of it, and we are losing about 3,000 acres of farmland to development every day. But growing aeroponics vertically requires only 10% of the room traditional farming needs.

In a U.S. Patent Publication Application No. US-2017/0347547 by Lu et al. (hereinafter referred to as the "'547 application"), Lu et al. disclose a cabinet for growing plants hydrophonically. The '547 application discloses a housing including different modules for automatic refilling of nutrient and disposing of sewage water. However, the growing area includes pods that can grow only one type of plant/vegetable at a time. Furthermore, the manner the pods are arranged, the '547 application cannot grow a sufficient amount of plants and can grow one type of plant at a time. That means, the user has to wait until one type of plant is harvested to grow another type of plant. Consequently, he/she has to reset the growing condition of the cabinet. Healthy consumption requires a variety of vegetables such as salads, tomatoes, onions, etc.

In addition, the door of the cabinet of the '547 application is designed to open outward, taking about three times more of spaces for the prior-art cabinet to fully operate. Thus, the operational space for the '547 application cabinet is the total of the thickness of the cabinet, the width of the door, and the space for the free movement of the user.

The air circulation system including fans of the '547 application cabinet is designed to blow directly into the plants as shown in FIG. 2. This arrangement increases the risk of damaging the plants/vegetables in the pod.

Continuing with the discussion of the prior-art cabinet of the '547 application, the water system and the arrangement of vertical growing pods are designed to save water. However, this arrangement increases the risk of creating uneven growing conditions. Those plants on top near the water source will have more nutrient than those in the bottom. Plants/vegetables on different levels will receive different amount of nutrients. Similarly, the lateral lighting device would adversely affect plants/vegetables qualities because those pods are far away from the lateral lighting will get lower lighting condition and photosynthesis.

Therefore what is needed is a smart growing cabinet that can grow different types of plants at the same time.

This means that, what is needed is smart growing cabinet that can simultaneously create different and precise growing conditions for different types of plants/vegetables at the same time.

Yet, what is needed is a smart growing cabinet that is mechanically designed so that it takes less rooms to operate, i.e., for users to go in and out to harvest or to control the conditions of the cabinet, facilitating healthy gardening in narrow home spaces.

Yet, what is needed is a smart growing cabinet that can create a balanced and even ventilation, lighting conditions, and nutrient level for all sorts of plants/vegetables.

The present invention provides solutions to the abobe needs.

SUMMARY OF THE INVENTION

Accordingly, an objective of the present invention is to provide a smart home gardening cabinet that includes a plurality of plant growing drawers each having a vertical lift door and an automatic precision weather system to grow a specific type of plants, each automatic precision weather system includes an array of lights for photosynthesis, an air circulation system, and a water circulation system that provides nutrient water to the specific type of plants in each plant growing drawer; each plant growing drawer having a planting tray that includes an array of planting holes filled with a sponge materials to absorb and retain nutrients which are misted to the roots of the plants, excess nutrient water being returned to the water circulation system to save water.

Another objective of the present invention is to provide a method for home gardening that includes providing a closed enclosure having a plurality of plant growing drawers, each having a vertical lift door; providing an automatic precision weather system (APWS) configured to set specific growing condition for each of plurality of plant growing drawers, setting a specific growing condition for each plant growing drawer based on the set growing conditions; and growing and cultivating specific plants/vegetables in each plant growing drawer.

Another objective of the present invention is to provide a computer-implemented software program for controlling an automatic precision weather system (APWS) for a smart cabinet that includes selecting a specific plant to grow in each of a plurality of plant growing drawers; filling water to a proper level in a mixing chamber; pouring a nutrient solution into the mixing water tank until the specific water nutrient water is reached; moving the specific water-nutrient solution mixture to one of the plurality of water-nutrient solution mixture containers; repeating the above steps until all containers of the plurality of water-nutrient solution mixture containers are filled with different specific water-nutrient solution mixtures for different specific plants; and controlling the automatic precision weather system (APWS) to provide the specific growing condition to specific plant in each of the plurality of plant growing drawers.

Another objective of the present invention is to provide a smart plant growing cabinet configured to grow different types of plants at the same time. This means that, what is needed is smart plant growing cabinet that can create different precise growing conditions for different types of plants/vegetables.

Another objective of the present invention is to provide a smart plant growing cabinet that is mechanically designed so that it takes less rooms to operate, i.e., for users to go in and out to harvest or to control the conditions of the cabinet.

Another objective of the present invention is to provide a smart plant growing cabinet that can create a balanced and even ventilation, lighting conditions, and nutrient level for all plants/vegetables.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
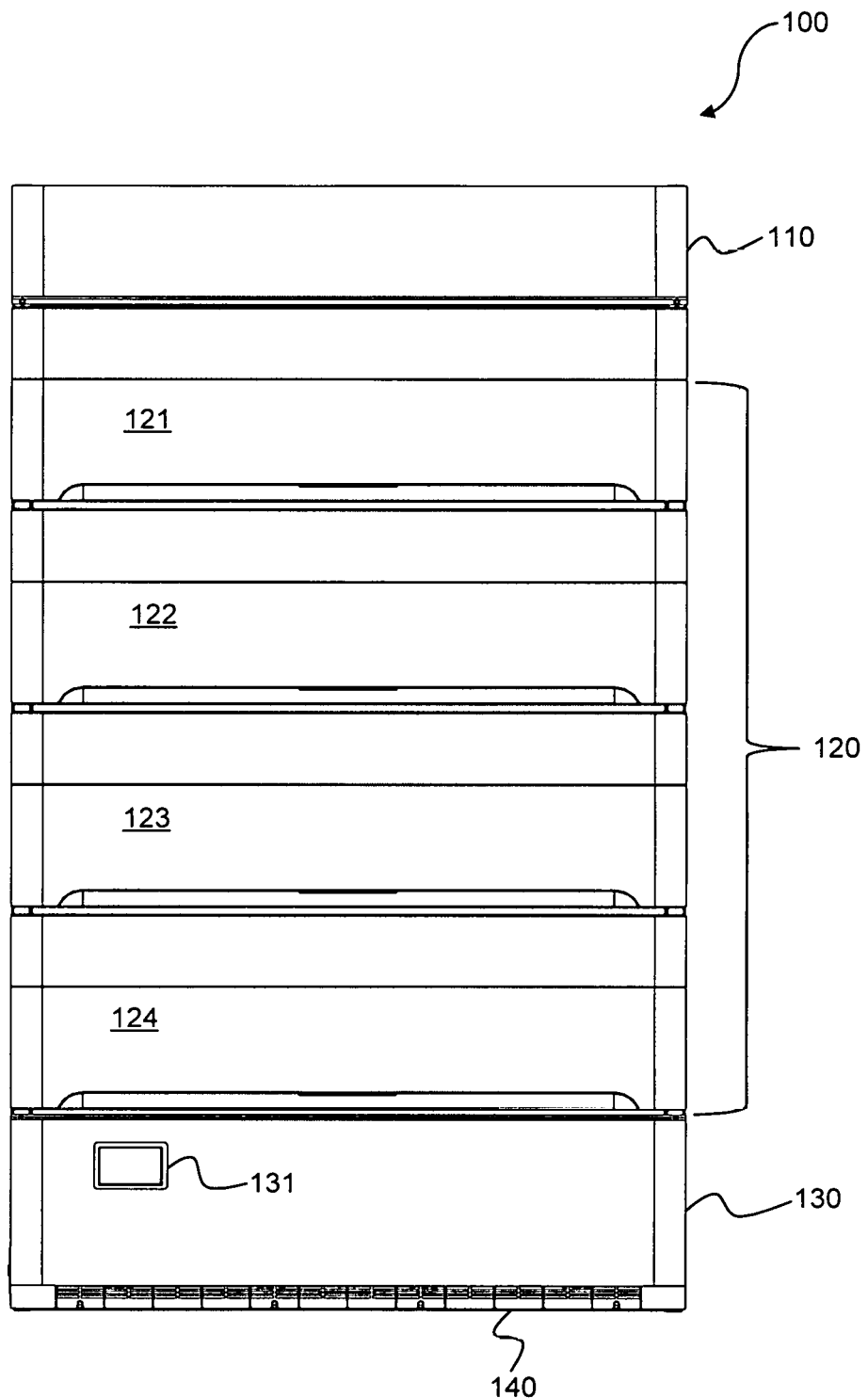
FIG. 1 is a schematic diagram of a smart cabinet for home gardening in accordance with an embodiment of the present invention.

Many aspects of the present invention are now described with reference to FIG. 1-FIG. 8. FIG. 1 illustrates a schematic diagram of a smart cabinet 100 for home gardening in accordance with an exemplary embodiment of the present invention.

In a general implementation of the present invention, smart cabinet 100 is a closed enclosure that includes a top section 110, a middle section 120, and a bottom section 130, each having a different function. Top section 110 is dedicated for pre-gardening and controlling functions. Middle section has a plurality of plant growing drawers 121-124 for growing different plants, depending on their specific growing conditions. Examples of specific growing conditions include but not limited to pH level, nutrient ratio, and ambient weather. Bottom section 130 is dedicated to contain specific water-nutrient mixture containers for each specific plant in each specific plant growing drawers 121-124. In one exemplary embodiment of the present invention, bottom section 130 also includes a touch screen display 131 for displaying and controlling the growing conditions for each plant growing drawer 121-124. Finally, an air outlet openings 140 are formed at the bottom of bottom section 130. Now referring next to FIG. 2A, a top view diagram of smart cabinet for home gardening 100 showing the components of a top section 200A is illustrated. As seen, top section 200 as well as smart cabinet 100 has a front side 201, a back side 202, a left side 203, and a right side 204. Top section 200 includes a pair of containers 210-220 that are used to contain organic solutions, a controller circuit 230 contained inside a box, a mixing tank 240 where the mixing between water and organic solution occur to produce a specific water-nutrient solution mixture for a specific plant. Mixing tank 240 has a nutrient sensor 241 that measures the water-nutrient ratio of a specific water-nutrient solution mixture in term of total dissolved solution (TDS) or par per million (PPM). Similarly, containers 210-220 has a nutrient sensors 211 and 221 respectively. Top section 200A also contains a pair of suction fans and air filters 251-252 designed to create a clean air flow within smart cabinet 100. In one exemplary embodiment of the present invention, the speed of suction fans and air filters 251-252 are controlled by controller circuit 230.

Figure 2A:
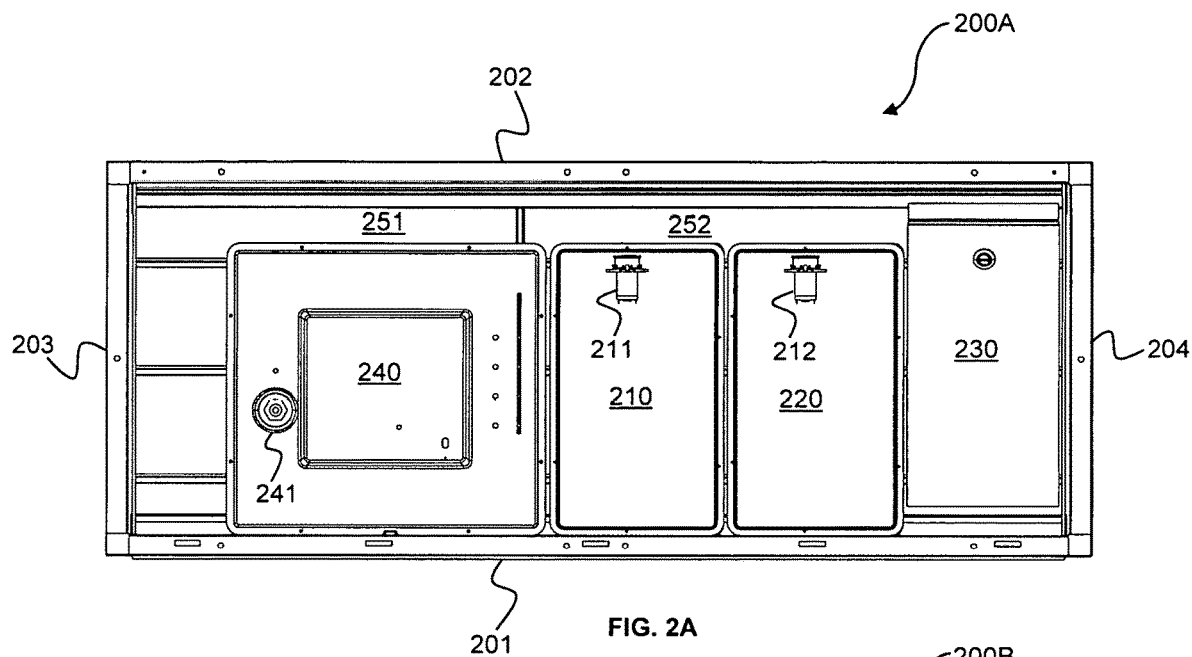
FIG. 2A is a top view of the top section of the smart cabinet for home gardening in accordance with an embodiment of the present invention.
Figure 2B:
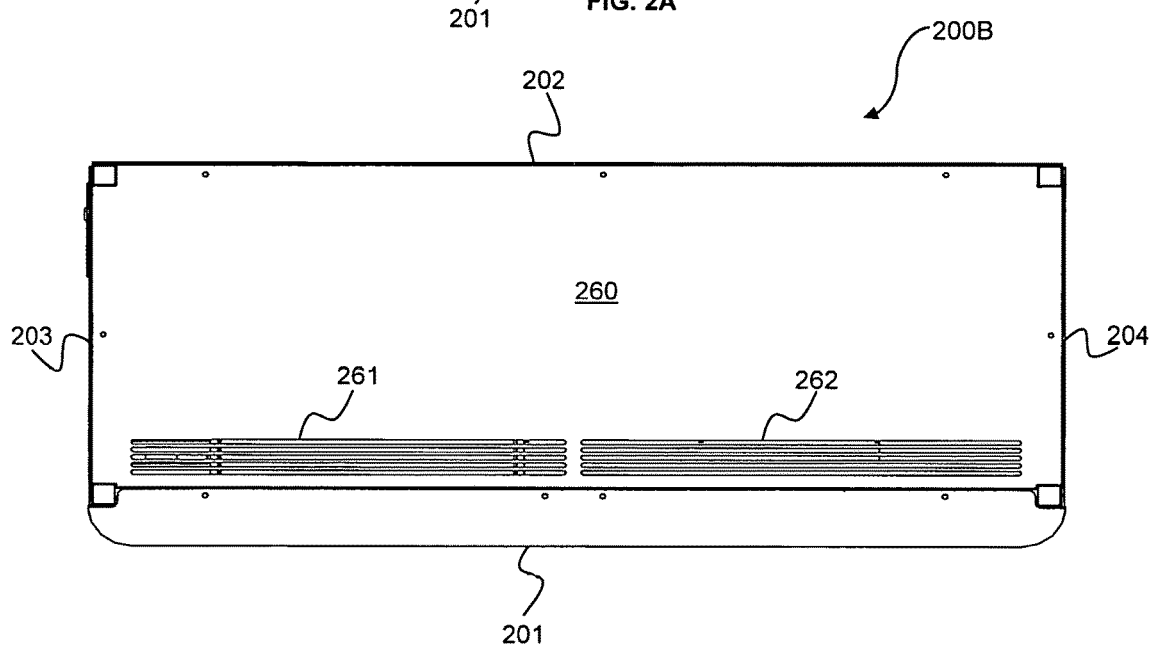
FIG. 2B is a top view of the top section of the smart cabinet with a lid fastened on to show the array of air input slits in accordance with an embodiment of the present invention.

Continuing with FIG. 2B, a schematic diagram of top section 110 with the lid fastened thereon so that air input slits are shown. A top lid 260 with arrays of air input slits 261-262 is fastened on top of top section 110. In many aspects of the present invention, an air circulation whose velocity can be controlled by controller circuit 230 is formed inside smart cabinet 100. Air is entered at arrays of input slits 261-262, filtered to remove impurities, circulated inside each drawers 121-124, and exited at air outlet openings 140. The detailed air circulation system of the present invention is described later.

Figure 3:
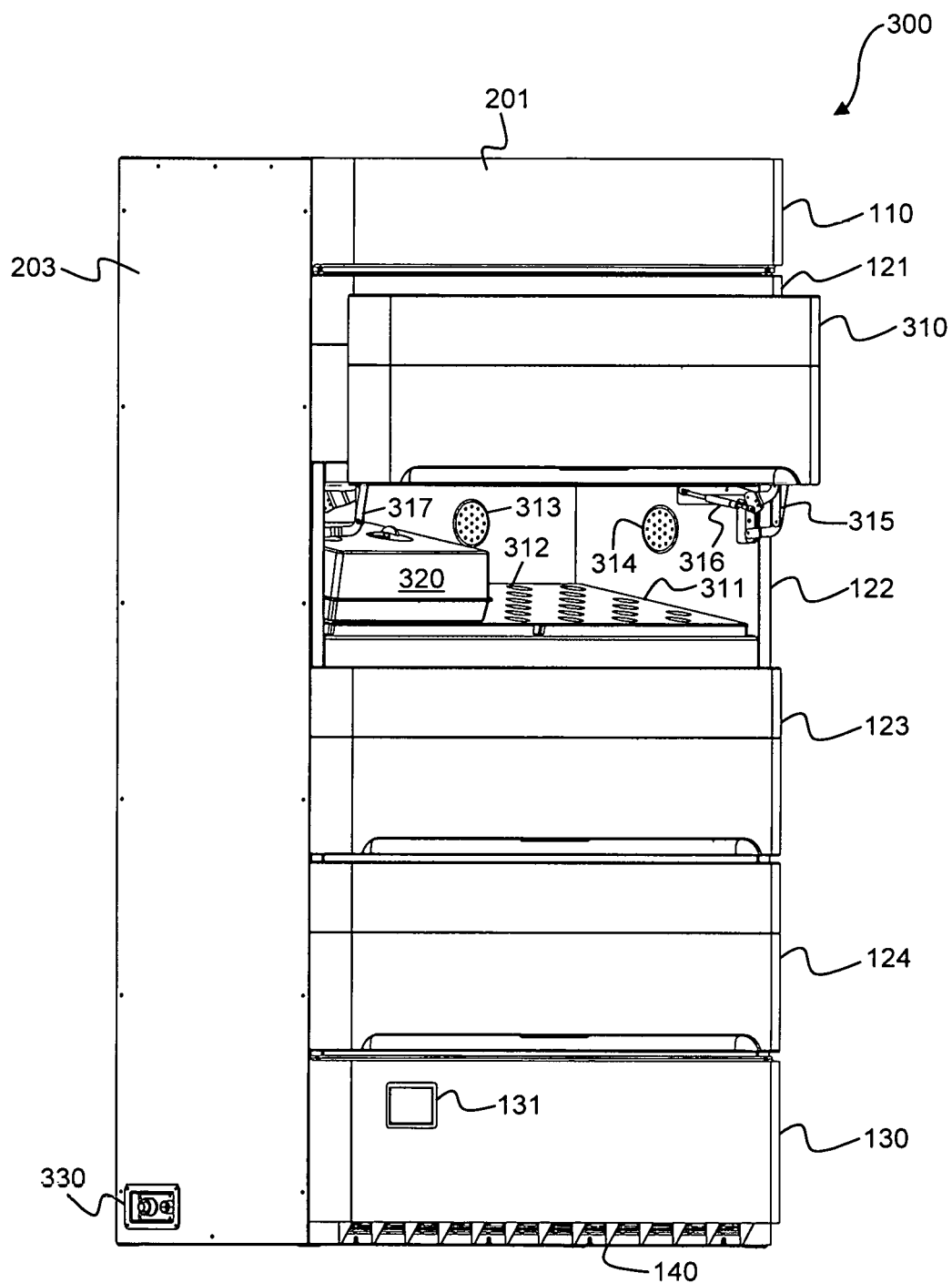
FIG. 3 is a perspective diagram showing the open position of a vertical lift door exposing the inner structure of a plant growing drawer of the smart cabinet for home gardening in accordance with an embodiment of the present invention.

Next referring to FIG. 3, a perspective diagram showing the open position of a vertical lift door 310 exposing the inner structure 300 of a drawer of the smart cabinet for home gardening in accordance with an embodiment of the present invention is illustrated. Vertical lift door 310 is attached to the right inner wall of plant growing drawer 122 by an upward curved hinge 315. A second curved hinge 316 attaches vertical lift door 310 to the left inner wall of drawer 122. A right pneumatic arm 316 and a left pneumatic arm 318 (not shown) is mechanically fastened so that vertical lift door 310 can open or close in a fashion that is almost parallel to the front surface of smart cabinet 100. Inside plant growing drawer 122, a plant growing tray 311 with an array of circular openings are formed on the top surface of plant growing tray 311. In one exemplary embodiment of the present invention, seedling box 320 is placed inside plant growing drawers 121-124 to grow seedlings for a specific plant. On the back wall 202, a pair of air inlet openings 313 are placed on the back wall of plant growing drawer 122. On the right side wall, an air outlet opening 314 is positioned. Near the bottom of right side 202, a water input/output faucet 330 that receives water from an external source is located.

Figure 4:
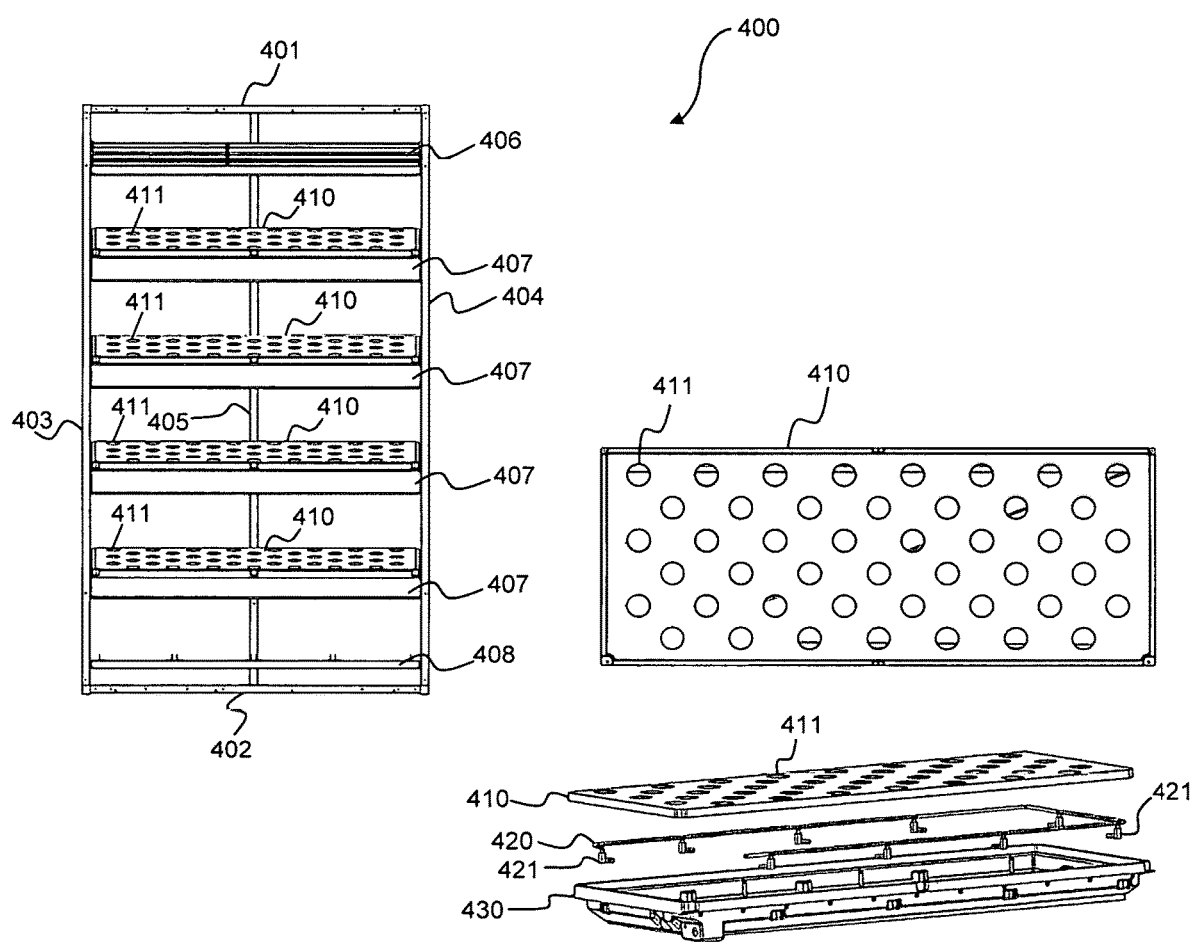
FIG. 4 is a schematic diagram illustrating the frame structure of the smart cabinet and the components of the plant growing tray in accordance with an exemplary embodiment of the present invention.

FIG. 4 is a schematic diagram illustrating a frame structure 400 of the smart cabinet and the components of the plant growing tray in accordance with an exemplary embodiment of the present invention. Frame structure 400 is made of metal frames including top frame bars 401, bottom frame bars 402, left frame bars 403, and right frame bars 404 mechanically connected together. A top section base 406, middle section bases 407, and a bottom base 408 are mechanically connected to frame structure 400 to form top section 110, middle section 120, and bottom section 130 respectively as described in FIG. 1 above. A vertical bar 405 mechanically connects top bars 401, bases 406-408, and bottom base 408 together to strengthen frame structure 400. A plurality of plant growing trays 410 is fastened to each middle section bases 407. As alluded above, plant growing tray 410 has an array of circular openings 411 for growing a specific plant. Right underneath plant growing tray 410 is a spraying tube 420 and sprinkler heads 421 that directly spray water-nutrient solution mixture directly to roots of the specific plant grown on each circular opening 411. In one exemplary embodiment, spraying tube 420 is formed around the perimeter to plant growing tray 410 and a water container 430. Water container 430 is laid underneath plant growing tray 410 to collect excess water.

Figure 5:
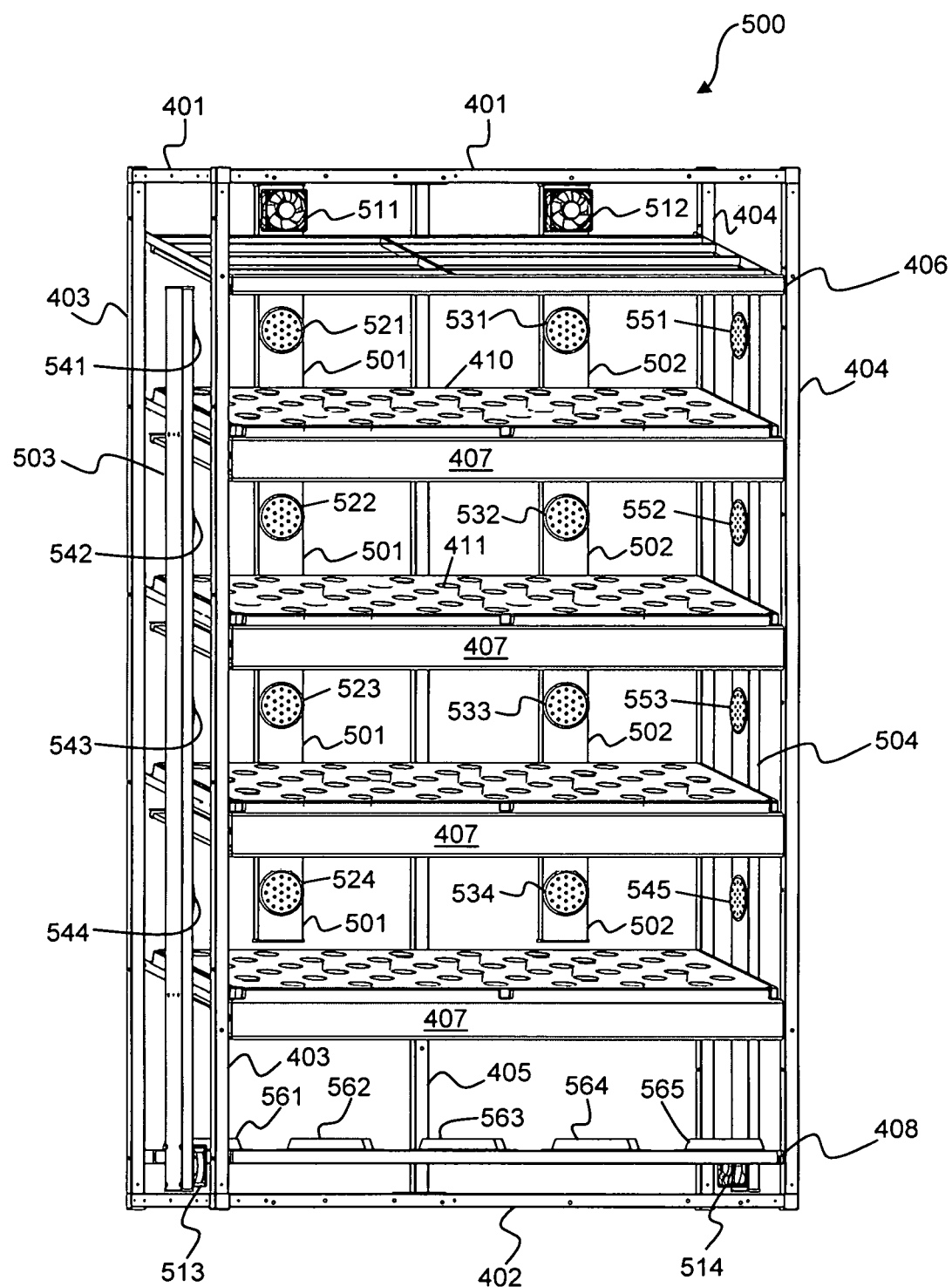
FIG. 5 is a schematic diagram illustrating the frame and the air circulation system of the smart cabinet for home gardening in accordance with an exemplary embodiment of the present invention.

Referring next to FIG. 5, a schematic diagram illustrating the frame and the air circulation system 500 of smart cabinet for home gardening 100 in accordance with an exemplary embodiment of the present invention is illustrated. As described in FIG. 4 above, smart cabinet 100 is built from frame structure 400 made of top frame bars 401, bottom frame bars 402, left frame bars 403, and right frame bars 404 mechanically connected together. A first hollow rectangular tube 501 and a second hollow rectangular tube 502 are connected to frame 400, top section bases 406, middle section bases 407, and bottom section 408, which is parallel to vertical ba 405. In the space of top section 110, first air suction fan 511 and a second air suction fan 512 are connected face first to first hollow rectangular tube 501 and second hollow rectangular tube 502 respectively. A third hollow rectangular tube 503 is connected to left frame bars 403 and a fourth hollow rectangular tube 504 is connected to right frame bars 404. In the space of bottom section 130, a third air suction fan 513 is connected to third hollow rectangular tube 503, and a fourth air suction fan 514 is connected to fourth hollow rectangular tube 504. Controller circuit provides power supplies and control the speed of all four suction fans 511-514. In one exemplary embodiment of the present invention, first air suction fan 511 and second air suction fan 512 are includes air filters (not shown) to filter out impurities from the ambient environment outside of smart cabinet 100. It is noted that first air suction fan 511 is the same as first suction fan and air filter 251 and second air suction fan 512 is the same as second suction fan and air filter 252. Referring again to FIG. 1, in the space of first plant growing drawer 121, four circular air openings 521, 531, 541, and 551 are connected to first hollow rectangular tube 501, second hollow rectangular tube 502, third hollow rectangular tube 503, and fourth hollow rectangular tube 504 respectively. Similarly, in the space of second plant growing drawer 122, four circular air openings 522, 532, 542, and 552 are connected to the same first hollow rectangular tube 501, second hollow rectangular tube 502, third hollow rectangular tube 503, and fourth hollow rectangular tube 504 respectively. In the space of third plant growing drawer 123, four circular air openings 523, 533, 543, and 553 are connected to first hollow rectangular tube 501, second hollow rectangular tube 502, third hollow rectangular tube 503, and fourth hollow rectangular tube 504 respectively. Finally, in the space of fourth plant growing drawer 124, four circular air openings 524, 534, 544, and 554 are connected to first hollow rectangular tube 501, second hollow rectangular tube 502, third hollow rectangular tube 503, and fourth hollow rectangular tube 504 respectively. In the space of bottom section 124, four base areas 562-565 are decicated to four water-nutrient solution mixture chambers (will be shown in FIG. 6). An area 561 is dedicated to touchscreen display and 131 circuitry is shown.

Referring again to FIG. 5, in operation, first air suction fan 511 and second air suction fan are located in top section 110 close to first array of air input slits 261 and second array of air input slits 262. Third air suction fan 513 and fourth air suction fan 514 are located in bottom section 130 close to air outlet openings 140. When turned on, first air suction fan 511 and second air suction fan 512 draw and filter air from outside into top section 110. This filtered air is drawn vertically downward because of gravity. In first plant growing drawer 121, air is pushed down via first hollow rectangular tube 521 and second hollow rectangular tube 531. This air is entered and filled first plant growing drawer 121 via first circular opening 521 and second circular opening 531. Then, air is pushed out of first plant growing drawer 121 via third circular opening 541 and fourth circular opening 551. The same air circulation event happens in second plant growing drawer 122 via first, second, third, fourth hollow rectangular tubes 501-504, air circular openings 522, 532, 542, and 552. Then, air is circulated in third plant growing drawer 123 via first, second, third, fourth hollow rectangular tubes 501-504, air circular openings 523, 533, 543, and 553. Finally, air is pushed down to fourth plant growing drawer 124 via first, second, third, fourth hollow rectangular tubes 501-504, air circular openings 524, 534, 544, and 554. After providing air, and other gases such as carbon dioxide ($CO_2$) for photosynthesis, air is exited smart cabinet 100 via air outlet openings 140.

Figure 6:
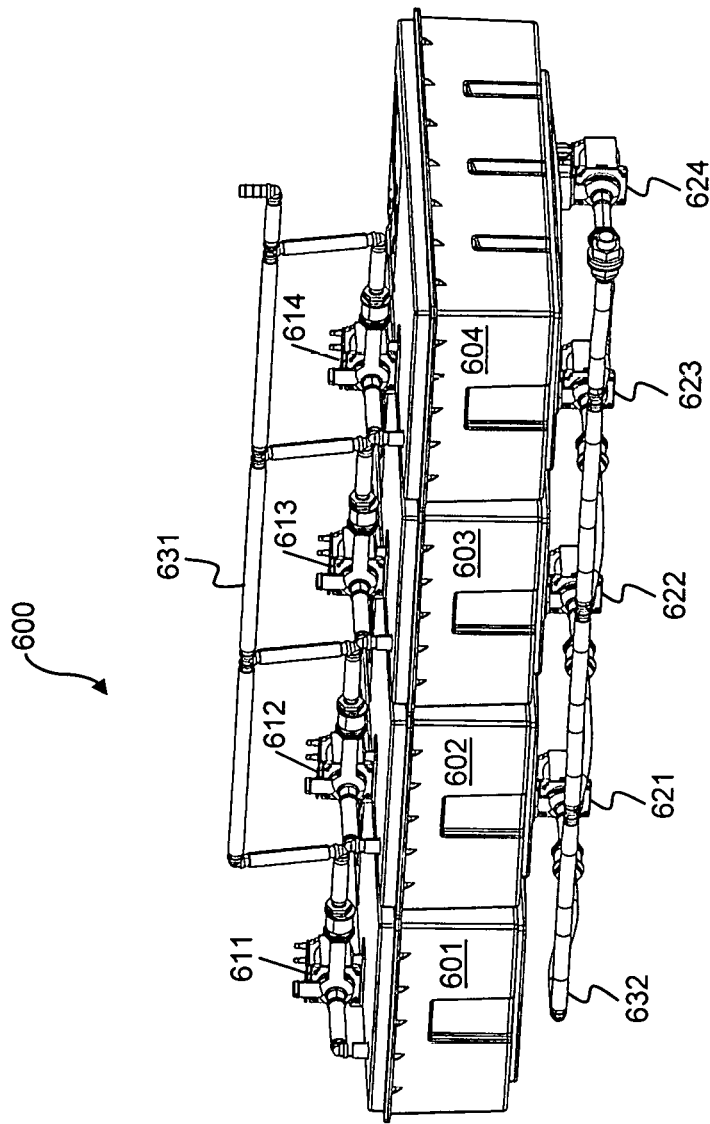
FIG. 6 is a schematic diagram illustrating the water-nutrient solution mixture containers—one for each plant growing drawer—in the bottom section of the smart cabinet for home gardening in accordance with an exemplary embodiment of the present invention.
Figure 6:
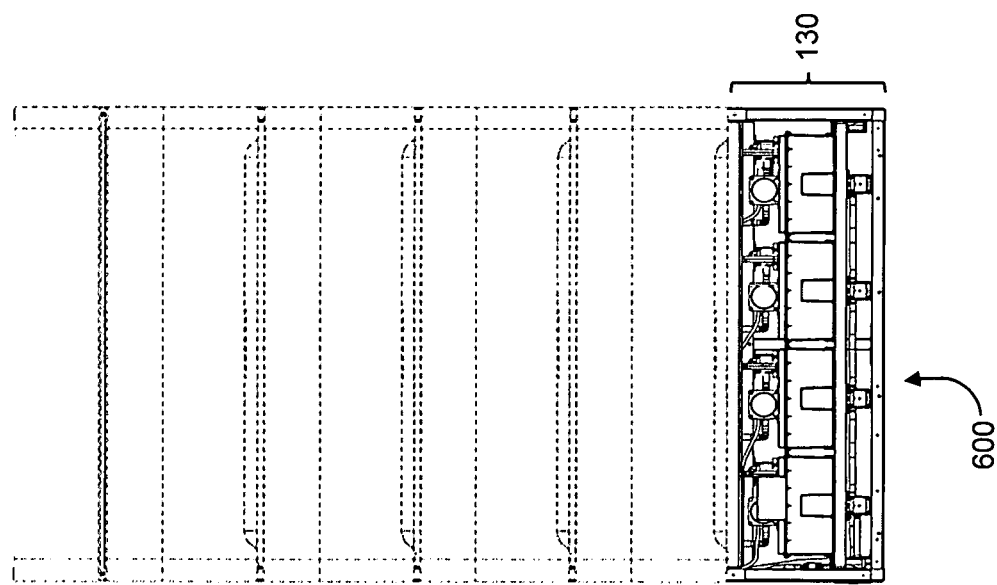

FIG. 5 above discloses the air ventilation system built-in into the frame of smart cabinet 100, now FIG. 6 and FIG. 7 disclose the water-nutrient solution distribution system in accordance with various embodiments of the present invention.

Referring now to FIG. 6, a schematic diagram illustrating the water-nutrient solution mixture containers 600—one for each plant growing drawer—in the bottom section 130 of smart cabinet for home gardening 100 in accordance with an exemplary embodiment of the present invention. As shown, water-nutrient solution mixture containers 600 includes a first water-nutrient solution mixture container 601 for first plant growing drawer 121, a second water-nutrient solution mixture container 602 for second plant growing drawer 122, a third a first water-nutrient solution mixture container 603 for first plant growing drawer 123, and a fourth water-nutrient solution mixture container 604 for first plant growing drawer 124. Next, a first distribution pump/valve device 611 is connected to first water-nutrient solution mixture container 601, a second distribution pump/valve device 612 is connected to first water-nutrient solution mixture container 602, a third distribution pump/valve device 613 is connected to third water-nutrient solution mixture container 603, and a fourth distribution pump/valve device 614 is connected to fourth water-nutrient solution mixture container 604. A distribution conduit 631 connects all distribution pump/valve devices 611-614 to containers 601-604 together. To control the temperature of each water-nutrient solution mixture device 601-604, a first cooling valve 621 is connected to control the temperature of first water-nutrient solution mixture container 601, a first cooling valve 622 is connected to control the temperature of second water-nutrient solution mixture container 602, a third cooling valve 623 is connected to control the temperature of third water-nutrient solution mixture container 603, and a fourth cooling valve 624 is connected to control the temperature of fourth water-nutrient solution mixture container 604. A cooling conduit 632 connects all cooling valves 621-624 and containers 601-604 to a cooling system (not shown).

Figure 7B:
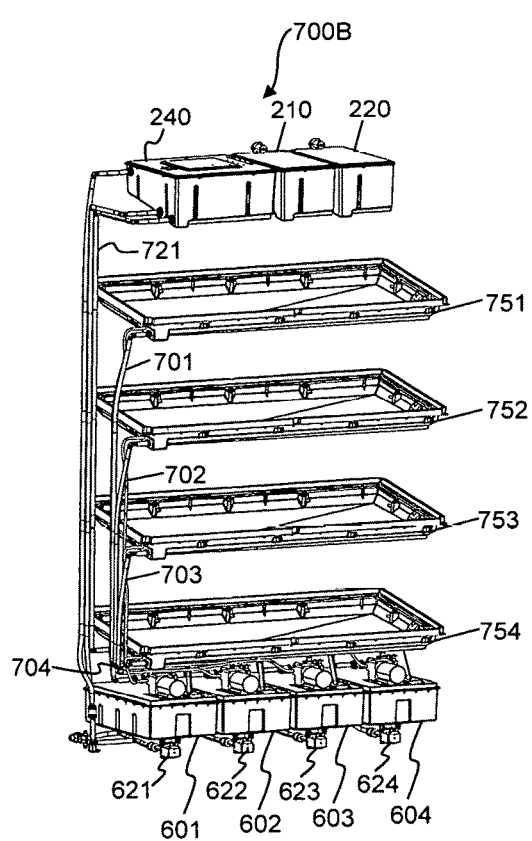
FIG. 7B is a schematic diagram of the complete water circulation system that provides water nutrient solution mixture to and receives excess water from each plant growing drawer in accordance with an embodiment of the present invention.
Figure 7A:
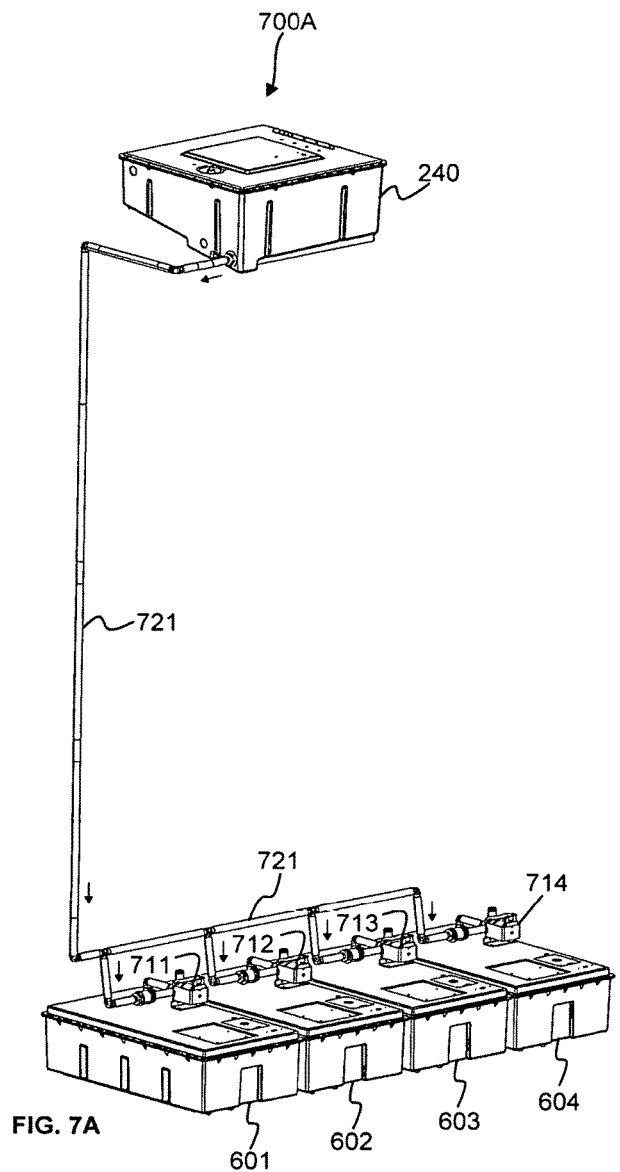
FIG. 7A is a schematic diagram of the water return system—a part of the water circulation system—in accordance with an embodiment of the present invention.

Now FIG. 7A-FIG. 7B describes the water circulation system of the present invention. FIG. 7A shows a schematic diagram of the water circulation system 700A from mixing tank 240 to water-nutrient solution mixture containers 601-604. Connection pipe 721 connects mixing tank 240 to a first receiving pump/valve 711, a second receiving pump/valve 712, a third receiving pump/valve 713, and a fourth receiving pump/valve 714. First receiving pump/valve 711 is, in turn, connected to first water-nutrient solution container 601 to provide water nutrient to first plant growing drawer 121. Second receiving pump/valve 712 is connected to second water-nutrient solution container 602 to provide nutrient to second plant growing drawer 122. Third receiving pump/valve 713 is connected to third water-nutrient solution container 603 to provide nutrient to third plant growing drawer 123. Fourth receiving pump/valve 714 is connected to fourth water-nutrient solution container 604 to provide nutrient to fourth plant growing drawer 122. First to fourth distribution pump/valve devices 611-614 and first to fourth receiving pump/valve 711-714 form a complete water circulation system as described in FIG. 7B as followed.

Referring now to FIG. 7B, a schematic diagram of a complete water circulation system 700B in accordance with an exemplary embodiment of the present invention is shown. From top section 110, mixing tank 240, after received the correct water-nutrient solution mixture from first and second organic containers 210 and 220, shall fill up either first to fourth water-nutrient solution mixture containers 601-604 by distribution pipes 731. First to fourth receiving pump/valve devices 711-714 under the control of controller circuit 230 decides which water-nutrient solution mixture containers 601-604 be filled. Similarly, this filling-in sequence of the proper water-nutrient solution mixtures for all water-nutrient solution mixture containers 601-604 is completed. Then, controller circuit 230 decides which first to fourth water-nutrient solution mixture containers 601-604 to supply water-nutrient mixtures to which water tray 751-754. In one exemplary embodiment of the present invention, first water-nutrient solution mixture container 601 supplies water nutrient solution mixture for first water tray 751 in first plant growing drawer 121 via first water pipe 701 where group I type of plants such as cress adapted to grow in a water-nutrient ratio of approximate 40 part per million (ppm) and pH level between 6.0 to 7.0. Second water-nutrient solution mixture container 602 supplies water nutrient solution mixture for second water tray 752 in second plant growing drawer 122 via second water pipe 702 where group II type of plants such as artichokes, corrianders, asparagus, lettuce, cinnamon adapted to grow in a water-nutrient ratio of approximate 540-1,000 part per million (ppm) and pH level between 6.0 to 7.0. Third water-nutrient solution mixture container 603 supplies water nutrient solution mixture for third water tray 753 in third plant growing drawer 123 via third water pipe 703 where group III type of plants such as beans, bell peppers, carrots, cauliflowers, radishes, mints, and basils adapted to grow in a water-nutrient ratio of approximate 1,200-1,600 part per million (ppm) and pH level between 6.0 to 6.5. Fourth water-nutrient solution mixture container 604 supplies water nutrient solution mixture for fourth water tray 754 in fourth plant growing drawer 124 via fourth water pipe 704 where group 4 type of plants such as tomatoes, cabbage, and beans adapted to grow in a water-nutrient ratio of approximate 1,700-2,100 part per million (ppm) and pH level between 5.5 to 6.5. It is noted that any groups of plants and vegetables with suitable water-nutrient ratio in ppm or in TDS and pH level range can be grown using smart cabinet 100 of the present invention and that the present invention is not limited to the groups of plants cited above. Any excess water in first to fourth water trays 751-754 is returned to appropriate water-nutrient solution mixture containers 701-704 via receiving pump/valve devices 711-714.

Figure 8A:
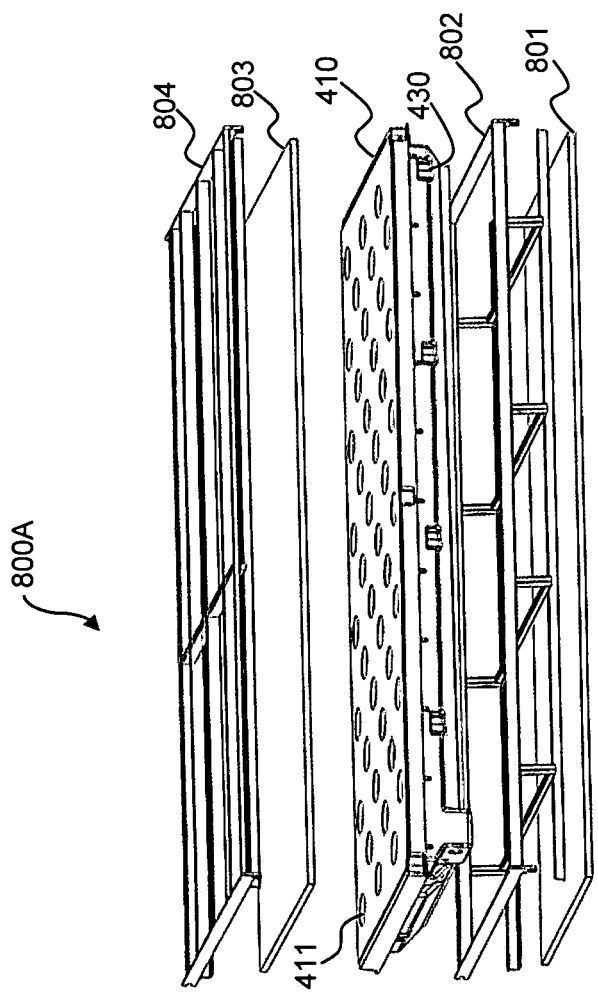
FIG. 8A is a schematic diagram of a lighting system integrated into a plant growing tray in accordance with an embodiment of the present invention.

Next, referring to FIG. 8A, a schematic diagram of a lighting system 800A integrated into a plant growing tray in accordance with an embodiment of the present invention is shown. From the bottom, a base 801 is laid on middle section base 407, a base frame 802 contains water container 430 and sprinkler heads 421. Next, lighting system 800A includes a glass cover 803 is connected to an array of lights 804. In one exemplary embodiment of the present invention, array of lights 804 is made of an array of light emitting diodes (LEDs) configured to operate in the visual spectrum of wavelengths ranging from 380 nm to 880 nm. However, it is noted that any wavelengths suitable to cultivate any plants/vegetables are within the scope of the present invention.

Figure 8B:
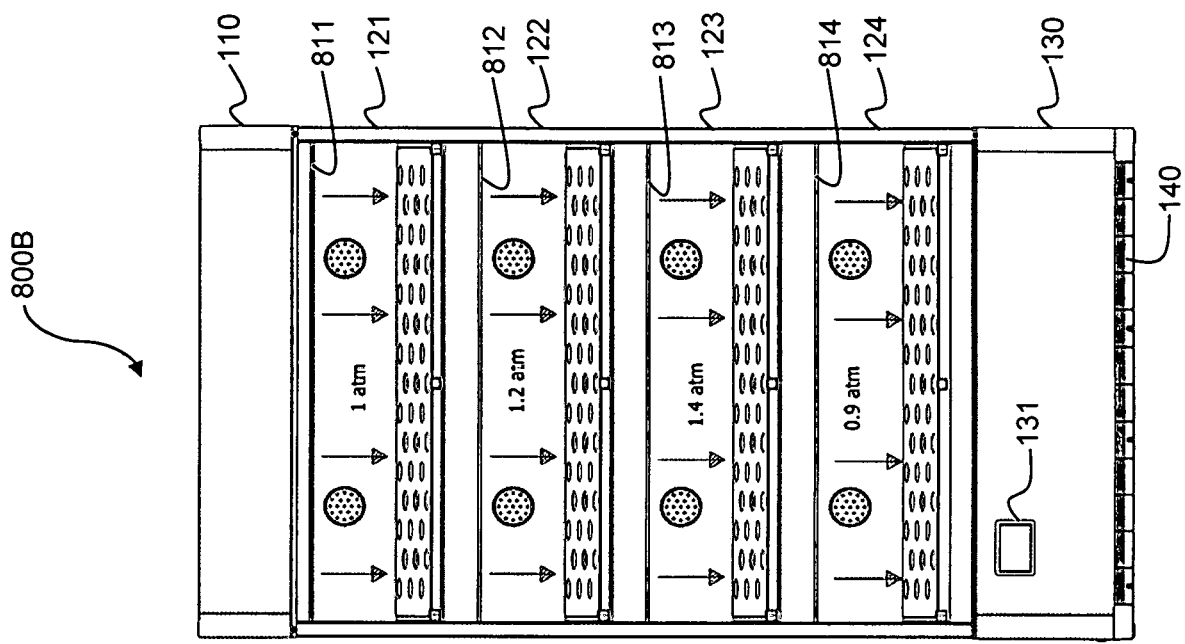
FIG. 8B is a schematic diagram of the smart cabinet with the lighting system in each of the plant growing cabinet in accordance with an embodiment of the present invention.

Now, FIG. 8B shows a schematic diagram of smart cabinet 100 having lighting system 800B in each of plurality of plant growing drawers in accordance with an exemplary embodiment of the present invention. A first LED lighting system 811 is connected to the roof of first plant growing drawer 121, a second LED lighting system 812 is connected to the roof of second plant growing drawer 122, a third LED lighting system 813 is connected to the roof of third plant growing drawer 123, and a fourth LED lighting system 814 is connected to the roof of fourth plant growing drawer 124. As such the lighting systems 811-814, air circulation systems 521-551, 522-552, 523-553, 524-554, array of air input slits 260-261, air output slits 140, water circulation systems 600-700 as described in FIG. 6, FIG. 7(A), and FIG. 7(B) form an automatic precision weather system (APWS) for each plant growing drawer 121-124. As alluded above, the automatic precision weather system is controlled by controller circuit 230 to create a specific favorable plant growing condition in each plant growing drawer 121-124. In one exemplary embodiment of the present invention, the automatic precision weather system (APWS) is controlled to set the growing condition in first plant growing drawer 121 to 1 atmospheric pressure, that in second plant growing drawer 122 to 1.2 atmospheric pressure, 1.4 atmospheric pressure in third plant growing drawer 123, and 0.9 atmospheric pressure in fourth plant growing drawer 124. In another exemplary embodiment, the automatic precision weather system (APWS) in each plant growing drawers 121-124 can be set and observed from touch screen display 130.

Figure 9:
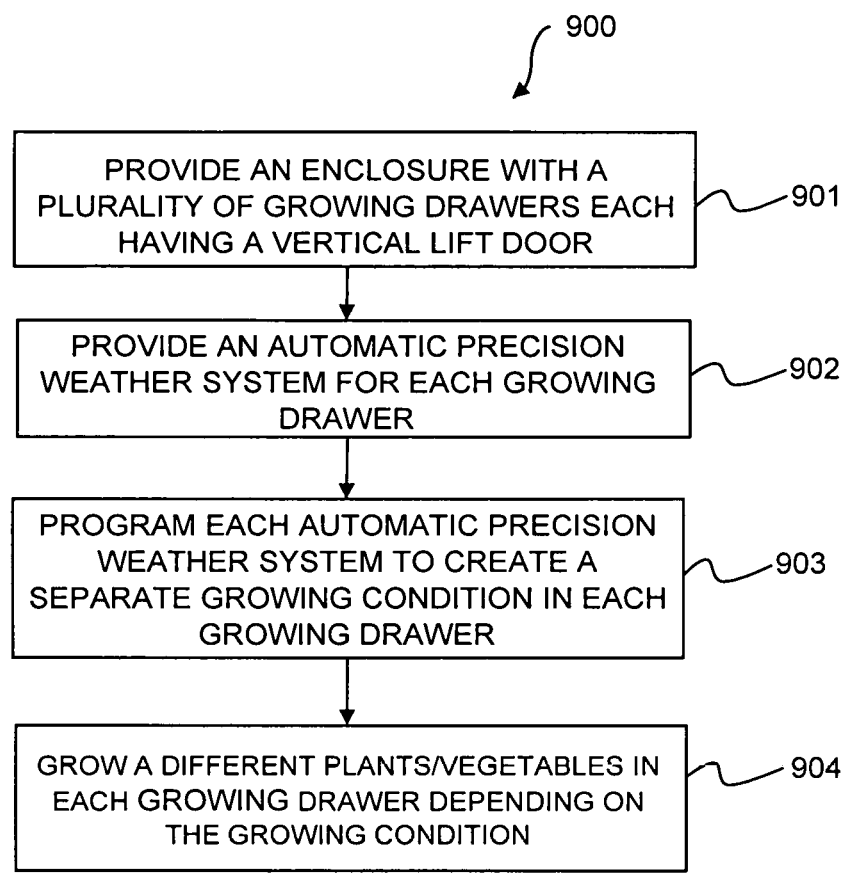
FIG. 9 is a flow chart of a method for home gardening of different types of plants simultaneously in a cabinet in accordance with an embodiment of the present invention.

Referring now to FIG. 9, a flow chart of a method for home gardening 900 of different types of plants simultaneously.

At step 901, a closed enclosure having a plurality of plant growing drawers, each with a vertical lift door and configured to grow a specific type of plant is provided. The close enclosure of step 901 can be implemented with a smart cabinet 100 as described in FIG. 1-FIG. 7(B) above. In many aspects of the present invention, smart cabinet 100 used to implement step 901 has vertical lift door 310 that opens and closes almost parallel to the outer front surface of smart cabinet 100 by virtue of a pair of upward curved hinges 315 and pneumatic arms 316.

At step 902, an automatic precision weather system (APWS) is provided for each plant growing drawer. In one exemplary embodiment of the present invention, the automatic precision weather system (APWS) of step 902 is implemented which includes an air circulation system as described in FIG. 5, a water circulation system as described in FIG. 6, FIG. 7(A), and FIG. 7(B), a LED lighting systems 811-814, mixing tank 240, and first to fourth water-nutrient solution mixture containers 601-604. In many aspects of the present invention, the automatic precision weather system (APWS) is implemented to provide a specific growing condition for each plant growing cabinet 121-124 so that a specific type of plants/vegetables can grow therein.

At step 903, each automatic precision weather system (APWS) is programmed to provide a specific growing condition in each plant growing drawer. Step 903 is realized by controller circuit 230 configured to mix the correct specific water-nutrient solution mixture for each water-nutrient solution mixture containers 601-604. Then each distribution pump/valve 611-612 is controlled to pump the correct water-nutrient solution mixture to the correct plant growing drawers 121-124. In there, sprinkler headers 421 mist the roots of the plants/vegetables with the correct water-nutrient solution mixture. Controller circuit 230 also chooses the correct fan speed for fans 521-551 in first plant growing drawer 121, fans 522-552 in second plant growing drawer 122, fans 523-553 in third plant growing drawer 123, and fans 524-554 in fourth plant growing drawer 124. The correct LED light is also chosen by controller circuit 230. It is noted that the light can be chosen by controller circuit 230 ranges from, but not limited to, 380 nm to 800 nm. Any light wavelength suitable to any purposes for growing healthy specific plants/vegetables are within the scope of the present invention. Any excess water nutrient solution mixture in water trays 751-754 is controlled to return to the correct water-nutrient solution mixture containers 601-604 so that water will not be wasted. In another aspect of step 903 of the present invention, the automatic precision weather system (APWS) can be controlled manually by touchscreen 131.

Continuing with step 903, in various aspects of the present invention, step 903 further includes steps of selecting specific plant to grow in each of plurality of plant growing drawers 121-124; filling water to a proper level in mixing tank 240; pouring a nutrient solution from first solution tank 210 and second solution tank 220 into the mixing tank 240 until the specific water nutrient solution mixture is reached; pumping the specific water-nutrient solution mixture to one of the plurality of water-nutrient solution mixture containers 601-604; repeating the above steps until all chambers of the plurality of water-nutrient solution mixture containers 601-604 are filled with different specific water-nutrient solution mixtures for different specific plants; and controlling the automatic precision weather system (APWS) to provide said specific growing condition to specific plant in each of plurality of plant growing drawers 121-124.

Step 903 can be implemented by a computer-implemented software program stored in a non-transitory memory device of controller circuit 230. It will be noted that processes 200-900 are performed by a computer software program 190 that is stored in a non-transitory computer readable medium of network server device 140. The non-transitory computer readable medium includes optical memory such as CD, DVD, HD-DVD, Blue-Ray Discs, etc.; semiconductor memory such as RAM, EPROM, EEPROM, etc.; and/or magnetic memory such as hard-disk drive, floppy-disk drive, tape drive, MRAM, etc. The computer software program also includes instructions that display a graphic user interface (GUI) on the display screen of touch screen display 131 and/or any combination thereof. When the GUI is activated by a user, step 903 is performed and the automatic precision weather system (APWS) is set as described above to achieve specific growing conditions for specific plants/vegetables.

Finally, at step 904, with specific growing condition for each plant growing drawer is established, specific plants/vegetables are grown and cultivated in each plant growing drawer. Step 904 is implemented by growing the following four groups of plants/vegetables:

Group I: a nutrient ratio of 40 Part per million (PPM) and a pH level of 6.0 to 7.0 in first plant growing drawer 121; example of group I includes water cress.

Group II: a nutrient ratio of 540-1,000 Part per million (PPM) and a pH level of 6.0 to 7.0 in a second plant growing drawer 122; example of group II includes artichokes, lettuce, asparagus, corianders, and cinnamon.

Group III: a nutrient ratio of 1,200-1,600 Part per million (PPM) and a pH level of 6.0 to 6.5 in third plant growing drawer 123; example of group III includes beans, bell peppers, carrots, cauliflowers, mints, basils, and cucumbers.

Group IV: a nutrient ratio of 1,700-2,100 Part per million (PPM) and a pH level of 5.5 to 6.5 in fourth plant growing drawer 124; example of group IV includes tomatoes and cabbages.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents there.

DESCRIPTION OF NUMERALS 100 smart cabinet for home gardening
110 top section
120 middle section
121 first plant growing drawer for growing a first type of plant
122 second plant growing drawer for growing a second type of plant
123 third plant growing drawer for growing a third type of plant
124 fourth plant growing drawer for growing a fourth type of plant
130 bottom section
131 a touch screen display
140 air outlet openings at the bottom side of the smart cabinet
200 a top view of the top section that reveals its components
201 front side
202 back side
203 left side
204 right side
210 first organic solution container
211 first nutrient pump
220 second organic solution container
221 second nutrient pump
230 controller circuit
240 mixing tank
241 water pump
251 first suction fan and air filter
252 second suction fan and air filter
260 top section lid
261 first array of air input slits
262 second array of air input slits
300 structure of inner structure of a plant growing drawer
310 vertical lift door
311 plant growing tray
312 an array of circular openings
313 air inlet openings
314 air outlet openings
315 first upward curved hinge
316 first pneumatic arm
317 second upward curve hinge
318 second pneumatic arm
320 seedling box
330 input/output water faucet
400 cabinet frame
401 top frame bars
402 bottom frame bars
403 left frame bars
404 right frame bars
405 vertical bar
406 top section base
407 middle section bases
408 bottom section base
410 plant growing tray in general
411 array of circular openings
420 spraying tube
421 sprinkler heads
430 water container
501 first hollow rectangular tube
502 second hollow rectangular tube
503 third hollow rectangular tube
504 fourth hollow rectangular tube
511 first air suction fan
512 second air suction fan
513 third air suction fan
514 fourth air suction fan
521 first circular air opening in first plant growing drawer
531 second air opening in first plant growing drawer
541 third air opening in first plant growing drawer
551 fourth air opening in first plant growing drawer
522 first circular air opening in second plant growing drawer
532 second air opening in second plant growing drawer
542 third air opening in second plant growing drawer
552 fourth air opening in second plant growing drawer
523 first circular air opening in third plant growing drawer
533 second air opening in third plant growing drawer
543 third air opening in third plant growing drawer
553 fourth air opening in third plant growing drawer
524 first circular air opening in fourth plant growing drawer
534 second air opening in fourth plant growing drawer
544 third air opening in fourth plant growing drawer
554 fourth air opening in fourth plant growing drawer
601 first water nutrient solution mixture container
602 second water nutrient solution mixture container
603 third water nutrient solution mixture container
604 fourth water nutrient solution mixture container
611 first distribution pump/valve
612 second distribution pump/valve
613 third distribution pump/valve
614 fourth distribution pump/valve
631 distribution conduit 632 cooling conduit
701 first water pipe
702 second water pipe
703 third water pipe
704 fourth water pipe
711 first receiving pump/valve
712 second receiving pump/valve
713 third receiving pump/valve
714 fourth receiving pump/valve
721 connection pipe
751 first water tray in first plant growing drawer
752 second water tray in second plant growing drawer
753 third water tray in third plant growing drawer
754 fourth water tray in fourth plant growing drawer
801 base
802 base frame
803 glass cover
804 LED lighting system and frame
811 LED lighting system for first plant growing drawer
812 LED lighting system for second plant growing drawer
813 LED lighting system for third plant growing drawer
814 LED lighting system for fourth plant growing drawer

What is claimed is:

1. A smart cabinet for home gardening, comprising:
a top section comprising a controller circuit, a water tank, and at least one nutrient solution tanks;
a middle section comprising a plurality of plant growing drawers arranged vertically;
a bottom section comprising a plurality of water-nutrient solution mixture containers and a valve/pump network arranged so as said valve/pump network is controlled by said controller circuit to provide a specific water-nutrient solution mixture having a specific water nutrient ratio for growing a specific group of plants in each of said plurality of plant growing drawers;
a lighting system, positioned on a ceiling of each of said plurality of plant growing drawers, capable of providing different type of lights for a photosynthesis process for said specific group of plants in each of said plurality of plant growing drawers;
a plant growing tray, located in each of said plurality of plant growing drawers, having an array of circular openings, each of said array of circular openings containing a sponge pod with a hole formed at a center to store a seed of said specific group of plants;
a nutrient spraying network, positioned below said water tray in each of said plurality of plant growing drawers and in communication with said plurality of water-nutrient solution mixture containers and said valve/pump network, capable of misting said specific water nutrient solution mixture from a bottom of said plant growing tray into roots of said group of specific plants in each of said plurality of plant growing drawers;
a water tray, positioned below and configured to collect said specific water nutrient solution mixture from said water tray;
a water circulation system operable to provide water to said water tray and to collect excess of said specific water nutrient solution mixture from said water tray back to said said plurality of water-nutrient solution mixture chambers; and
an air circulation system capable of circulate different amount of air for said specific group of plants inside each of said plurality of plant growing drawers;
wherein said plurality of plant growing drawers further comprises:
a first plant growing drawer configured to grow a first specific group of plants that has a nutrient ratio of 40 Part per million (PPM) and a pH level of 6.0 to 7.0;
a second plant growing drawer configured to grow a second specific group of plants that has a nutrient ratio of 540-1,000 Part per million (PPM) and a pH level of 6.0 to 7.0;
a third plant growing drawer configured to grow a third specific group of plants that has a nutrient ratio of 1,200-1,600 Part per million (PPM) and a pH level of 6.0 to 6.5; and
a fourth plant growing drawer configured to grow a fourth specific group of plants that has a nutrient ratio of 1,700-2,100 Part per million (PPM) and a pH level of 5.5 to 6.5.

2. The smart cabinet of claim 1 wherein said top section further comprises an air filter and exhaustion fans electrically connected to said controller circuit.

3. The smart cabinet of claim 1 wherein said water container and said at least one nutrient solution containers further comprises:
a pH level meter;
a nutrient sensor; and
a water level sensor, all are electrically connected to said controller circuit.

4. The smart cabinet of claim 1 wherein each of said plurality of plant growing drawers further comprises:
a plurality of air inlet openings positioned on a back of each of said plurality of plant growing drawers; and
a plurality of air outlet openings positioned on side walls of each of said plurality of plant growing drawers.

5. The smart cabinet of claim 4 wherein said air circulation system further comprises:
a plurality of air inlet slits positioned on a top of said top section;
a plurality of air outlet slits positioned at a bottom front of said bottom section; and
a plurality of electrical fans, controlled by said controller circuit so that air is entered and circulated vertically from said array of air inlet slits and said plurality of air inlet openings and distributed inside each of said plurality of plant growing drawers and then exit from said plurality of air outlet openings and said plurality of air outlet slits.

6. The smart cabinet of claim 1 wherein said bottom section further comprises a water sprinkler system connected to an outside water source to provide water to said water tank.

7. The smart cabinet of claim 1 wherein each circular opening has a diameter of 50 cm and a distance from a perimeter of adjacent circular openings are 100 cm and wherein said tray further comprises 45 circular openings for growing said specific group of plants.

8. The smart cabinet of claim 2 wherein said lighting system comprises an array of light emitting diodes (LEDs) and each of said plurality of plant growing drawers has a different array of LEDs that emit a frequencies ranging from 380 nm to 800 nm for said specific group of plants.

9. The smart cabinet of claim 1 further comprising a plurality of air filtering devices located on sidewalls of said smart cabinet and having a capacity of 360 m$^3$ per hour.

10. The smart cabinet of claim 3, further comprising a display device, mechanically connected to a front side of said fourth plant growing drawer and electrically coupled to said controller circuit, configured to display:
a pH level from said pH level meter;
a nutrient measurement from said nutrient sensor; and a water level from said water level sensor, all are electrically connected to said controller circuit.

11. The smart cabinet of claim 1 wherein each of said plurality of plant growing drawers further comprises a vertical lift door configured to open and close vertically.

12. The smart cabinet of claim 11 wherein said vertical lift door further comprises an upward curved hinge permanently fastened to a middle of said smart cabinet in front of said plant growing drawer; and a pneumatic arm connected to said upward curved hinge and to a bottom of said plant growing drawer so as when said pneumatic arm extends outward, said vertical lift door slides upward close to and almost parallel to the front surface of said smart cabinet; and wherein when said pneumatic arm withdraws said vertical lift door slides back to close said plant growing drawer.

13. The smart cabinet of claim 5 wherein said plurality of air inlet slits further comprises a first array of parallel rectangular openings formed on said top of said top section.

14. The smart cabinet of claim 5 wherein said plurality of air outlet slits further comprises a second array of parallel rectangular openings formed on said bottom front of said bottom section.

15. The smart cabinet of claim 5 further comprising:
a first hollow rectangular tube, mechanically connected to a back wall of said smart cabinet, extending vertically from said top section to said fourth plant growing drawer;
a second hollow rectangular tube, mechanically connected to said back side of said smart cabinet, extending vertically from said top section to said fourth plant growing drawer and parallel to said first hollow rectangular tube;
a third hollow rectangular tube, mechanically connected to a first side wall of said smart cabinet, extending vertically from said first plant growing drawer to said bottom section;
a fourth hollow rectangular tube, mechanically connected to a second side wall opposite to said first side wall of said smart cabinet, extending vertically from said first plant growing drawer to said bottom section and parallel to said third hollow rectangular tube.

16. The smart cabinet of claim 15 wherein said plurality of electrical fans further comprises:
a first electrical fan mechanically coupled to the top of said first hollow rectangular tube;
a second electrical fan mechanically coupled to the top of said second hollow rectangular tube;
a third electrical fan mechanically coupled to said the bottom of said third hollow rectangular tube; and
a fourth electrical fan mechanically coupled to the bottom of said fourth hollow rectangular tube.

17. A plant growing apparatus, comprising:
a controller circuit;
a plurality of drawers configured to grow different plants in each of said plurality of drawers;
a plurality of water-nutrient solution mixture containers and a valve/pump network arranged so as said valve/pump network is controlled by said controller circuit to provide a specific water-nutrient solution mixture having different water nutrient ratios for growing said different plants;
a lighting system, positioned inside said plurality of drawers, capable of providing a specific light frequencies for a specific photosynthesis process for said specific plant grown inside each of said plurality of drawers;
a ventilation system operable to provide air flows for each of said plurality of drawers;
a water circulation system operable to provide a specific amount of water to said specific plant grown in each of said plurality of drawers using said controller circuit; wherein said plurality of drawers further comprises:
a first drawer configured to grow a first specific plant that has a nutrient ratio of 40 Part per million (PPM) and a pH level of 6.0 to 7.0;
a second drawer configured to grow a second specific plant that has a nutrient ratio of 540-1,000 Part per million (PPM) and a pH level of 6.0 to 7.0;
a third drawer configured to grow a third specific plant that has a nutrient ratio of 1,200-1,600 Part per million (PPM) and a pH level of 6.0 to 6.5; and
a fourth drawer configured to grow a fourth specific plant that has a nutrient ratio of 1,700-2,100 Part per million (PPM) and a pH level of 5.5 to 6.5.

18. The plant growing apparatus of claim 17 wherein each of said plurality of drawers further comprises a plant growing tray having an array of circular openings, each of said array of circular openings contains a sponge pod with a hole formed at a center to store a seed of said specific plant.

19. The plant growing apparatus of claim 17 further comprising a nutrient spraying network, in fluid communication with said plurality of water-nutrient solution mixture containers and said valve/pump network, capable of misting said specific water nutrient solution mixture into roots of said specific plant.

20. The plant growing apparatus of claim 17 further comprising:
a pH level meter;
a nutrient sensor; and
a water level sensor, all are electrically connected to said controller circuit.

* * * * *

UNITED STATES PATENT AND TRADEMARK OFFICE
CERTIFICATE OF CORRECTION

PATENT NO. : 10,709,076 B2  
APPLICATION NO. : 16/139097  
DATED : July 14, 2020  
INVENTOR(S) : Pham Page 1 of 1

It is certified that error appears in the above-identified patent and that said Letters Patent is hereby corrected as shown below:

On the Title Page

Item (71), the Applicant Name:  
Tuan Anh Pham  
Please change to:  
Treant Protector PTE. LTD.

Signed and Sealed this  
Seventh Day of December, 2021

Drew Hirshfeld  
*Performing the Functions and Duties of the*  
*Under Secretary of Commerce for Intellectual Property and*  
*Director of the United States Patent and Trademark Office*